(12) United States Patent
Hayduke et al.

(10) Patent No.: US 6,300,567 B1
(45) Date of Patent: *Oct. 9, 2001

(54) JUNCTION BOX FOR LOW VOLTAGE DATA, VIDEO OR COMMUNICATIONS CONNECTIONS

(75) Inventors: Nicholas Hayduke, Marcellus; David Dowd, North Syracuse, both of NY (US)

(73) Assignee: Pass & Seymour, Inc., Syracuse, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,350

(22) Filed: Apr. 12, 1999

(51) Int. Cl.[7] .................................................. H01H 13/04
(52) U.S. Cl. ................................................................ 174/58
(58) Field of Search ............................... 174/50, 58, 65 R; 220/3.2

(56) References Cited

U.S. PATENT DOCUMENTS

| | | | |
|---|---|---|---|
| 3,197,548 | * 7/1965 | Weitzman et al. | 174/58 X |
| 3,926,330 | * 12/1975 | Deming et al. | 174/58 X |
| 5,354,953 | * 10/1994 | Nattel et al. | 174/58 X |
| 5,471,013 | * 11/1995 | Marchetti | 174/65 R |
| 5,646,371 | * 7/1997 | Fabian | 174/58 |
| 5,717,164 | * 2/1998 | Shetterly | 174/58 |
| 5,929,378 | * 7/2000 | Guisti | 174/65 R |

* cited by examiner

Primary Examiner—Dean A. Reichard
Assistant Examiner—Hung T Nguyen
(74) Attorney, Agent, or Firm—Wall Marjama & Bilinski

(57) ABSTRACT

An open ended junction box for low voltage electrical circuits includes fittings on one open end of the box for attaching a wall plate to the box, and a cable retainer on the other open end of the box for retaining a low voltage electrical wire.

16 Claims, 7 Drawing Sheets

JUNCTION BOX FOR LOW VOLTAGE DATA, VIDEO OR COMMUNICATIONS CONNECTIONS

FIELD OF THE INVENTION

This invention relates generally to junction boxes for terminating electrical circuits on the surfaces of walls, floors, or ceilings, and more particularly to open ended junction boxes for terminating data, video, communications and other low voltage circuits and having a cable retainer in an open end.

BACKGROUND OF THE INVENTION

During the course of conventional building construction, electrical circuits including power circuits, hereinafter referred to as high voltage circuits, and communication, data, and video circuits, all examples of low voltage circuits, are usually installed in walls, floors or ceilings before the wallboard, ceiling tiles, or floor boards are installed. For example, in a conventional wood frame residential construction, walls are constructed of frames made of lumber such as 2×4's nailed together to form the frame and positioned in place. Wallboard, such as plaster board, drywall or similar material is attached to the frames and a finish surface, such as paint, wallpaper, paneling or the like is applied to the wallboard.

Ordinarily, high voltage and low voltage electrical circuits are installed in the wood framing before the wall board, floor boards, ceiling tiles or the like are fixed to the framing. High voltage wiring, such as AC wiring and the like is conventionally terminated in a junction box, typically made from plastic or metal, that is nailed to a stud in the wood frame while under construction. Typically the junction box is nailed to the stud and the wiring is run from a central distribution point such as a circuit breaker box, throughout the building, terminating in junction boxes wherever electrical outlets, switches, or the like are to be located.

Junction boxes of the type presently used to terminate high voltage electrical circuits are designed to work effectively with the particular types of cable employed in the circuits. For example, flat plastic insulated multi-conductor cable of the type sometimes sold under the trademark ROMEX® is widely used. Junction boxes for use with ROMEX® cable typically include clamps, one type of which includes opposed angled plastic flaps that are flexibly attached to the box and arranged so that the free ends abut each other in an angled relationship. The high voltage electrical wire can be inserted between the flaps into the junction box, but resists being withdrawn from the flaps. In this way, the electrical wiring can be installed, the ends of the wires positioned in the junction boxes, and the wall, floor, or ceiling finish construction completed without the wiring falling out of the box back into the wall where it is difficult to retrieve after the wallboard, for example, is applied.

Low voltage wiring such as video, data and communications wiring has different physical characteristics and different installation requirements from high voltage wiring. Typically, low voltage wiring is smaller, and in most instances is designed to operate at a much higher frequency than high voltage wiring, and therefore is more susceptible to damage by kinking, low radius turns or the like. While it is physically possible to terminate low voltage wiring in the same types of junction boxes used for high voltage wiring, this type of installation commonly results in damage to the wire and degradation of the circuits carried by the wire.

In an attempt to overcome some of these problems, it has been common for installers to mount a separate junction box to a wall stud for terminating low voltage circuits. In order to prevent damage to the wires carrying the low voltage circuits, one technique commonly employed has been to physically cut the back end of the box off leaving essentially an open rectangular frame affixed to the stud, but still carrying the necessary mounting flanges or the like to mount a plate in which a terminating connector or the like can be fastened. This open frame technique eliminates the damage caused by attempting to use clamps or the like that are designed for holding high voltage wires, and also addresses the problem of eliminating crimping and low radius turns, but introduces a new problem.

When low voltage wiring is installed in the manner just described, it is common for the wiring, unless somehow restrained, to slip out of the junction box back into the wall at the time the wall board, or equivalent ceiling or floor finishes are attached to the framing. When the time comes to install the connectors for the low voltage cable, it is necessary to fish the cable out of the wall, and this is time consuming and annoying to the installer.

It is an object of this invention to provide an improved junction box, especially designed for terminating low voltage electrical wiring.

It is another object of this invention to provide a box of the type described that prevents low voltage wiring from accidentally slipping back into a wall between the time it is installed and the time the wall board and subsequently the connectors are attached.

It is another object of this invention to provide a junction box for low voltage wiring that is versatile, inexpensive, and easy to employ.

SUMMARY OF THE INVENTION

Briefly stated, and in a presently preferred embodiment of the invention, a junction box for low voltage electrical wiring comprises a generally rectangular box, made of plastic or metal, and having one or more nail holders for attaching a box to a stud of a wooden wall frame. The box includes an open front having one or more points of attachment for securing a plate holding a connector for the low voltage electrical circuit. The box has an at least substantially open rear portion, and a cable retainer for holding a low voltage wire adjacent the rear opening of the box, so that the wire can be retrieved after the wallboard or the like is fastened to the wall over the box.

BRIEF DESCRIPTION OF THE DRAWINGS

The novel aspects of the invention are set forth with particularity in the appended claims. The invention itself, together with further objects and advantages thereof may be more readily comprehended by reference to the following detailed description of several presently preferred embodiments of the invention, taken in conjunction with the accompanying drawings, in which:

DETAILED DESCRIPTION OF THE PREFERRED EMBODIMENTS

Figure 1:
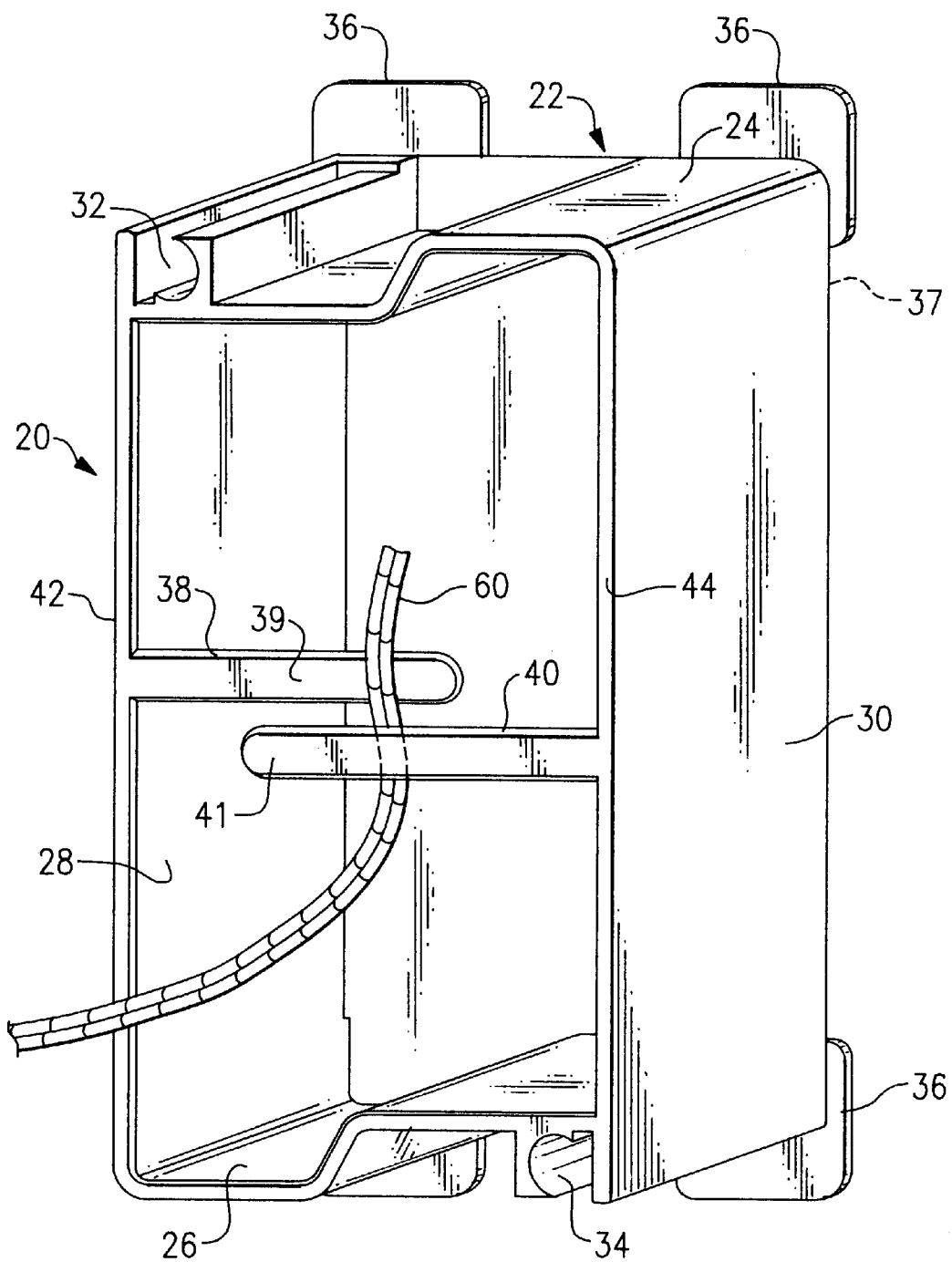
FIG. 1 is a perspective view of a junction box in accordance with a first embodiment of the invention.

Referring to FIG. 1, a junction box 20 for terminating a low voltage electrical circuit is illustrated in a rear perspective view. The box 20 includes a generally rectangular body 22 having a top wall 24, a bottom wall 26, a left side wall 28 and a right side wall 30. The junction box 20 may be made of metal or plastic. Preferably, the junction box 20 of FIG. 1 is formed from moldable plastic, such as polystyrene or the like, which makes the box easy to manufacture using standard injection molding techniques. Each surface of the top and bottom walls 24, 26 of the box includes a channel 32, 34 respectively into which a mounting screw, such as a screw that is inserted through a face plate in which a connector terminating the circuit is mounted, is disposed. The channels 32, 34 may be threaded, or they may be manufactured in sizes such that insertion of a self-tapping screw will form threads in the channel to secure the plate to the front surface of the box. Optionally, mounting tabs 36 are attached to the four corners of the front surface 37 of the box 20.

Preferably, although not shown in the drawing, nail holders are provided for retaining nails used for attaching the box to a stud in a wall frame, as heretofore described.

First and second laterally extending cable retainers 38, 40 are attached to the respective rear edges 42, 44 of the left and right side wall members of the box 20 so that a length 39 of the first cable retainer 38 is coextensive with and parallel to a length 41 of the second cable retainer 40, both retainers being in essentially the same plane. The retainers 38, 40 are preferably sufficiently flexible, and spaced close enough together so that a low voltage cable 60 can be inserted between the lengths 39 and 41 and retained therebetween during subsequent construction. When access to the cable is needed for connecting the wire to a terminating connector in a wall plate or the like, the cable 60 remains securely held by the retainers 38, 40. Preferably, at the time of connecting the wire to the connector, the cable is removed from the retainers, any damaged portion cut from the cable, and the undamaged wire attached to the connector. This permits a connection to be made with no damage to the wire, and without requiring a short radius bend.

Figure 2:
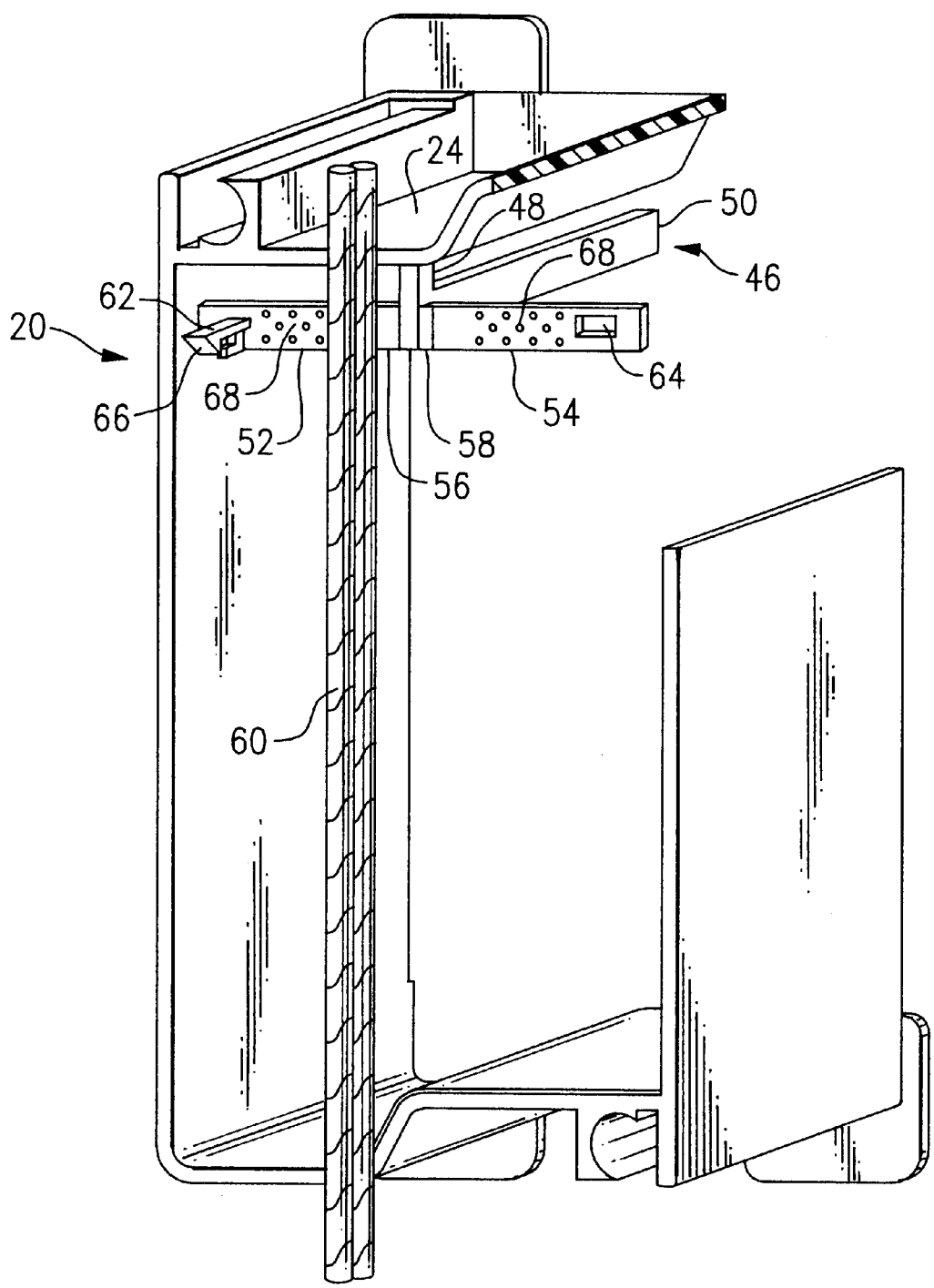
FIG. 2 is a partly cut away perspective view of the junction box in accordance with another embodiment of the invention.

FIG. 2 shows an alternative embodiment of the invention. In this and other figures, like elements are designated by like reference numerals. The box 20 in FIG. 2 is substantially similar to the box shown in FIG. 1, except that the retaining mechanism is different. A clamping assembly 46 is attached to approximately the center of the top wall 24 of the junction box 20 by a removable link 48 and depends downwardly therefrom. Connected to the link 48 are a handle 50 and first and second clamping arms 52, 54. First and second clamping arms 52, 54 are connected to the link 48 by a hinge, for example, living hinges 56, 58 respectively, or the like. As constructed, the clamping arms 52, 54 are open as shown in FIG. 2. A cable 60 is positioned behind the clamping arms 52, 54 and then the clamping arms 52, 54 can be pivoted towards each other about the living hinges 56, 58. The first arm 52 has a fastening hook 62 attached near a distal end thereof, and the second arm 54 has a cooperating opening 64 formed near it's distal end therein for receiving a barbed end 66 of the hook 62. Each arm is preferably provided with integral gripping members 68 for gripping the cable 60.

Figure 3:
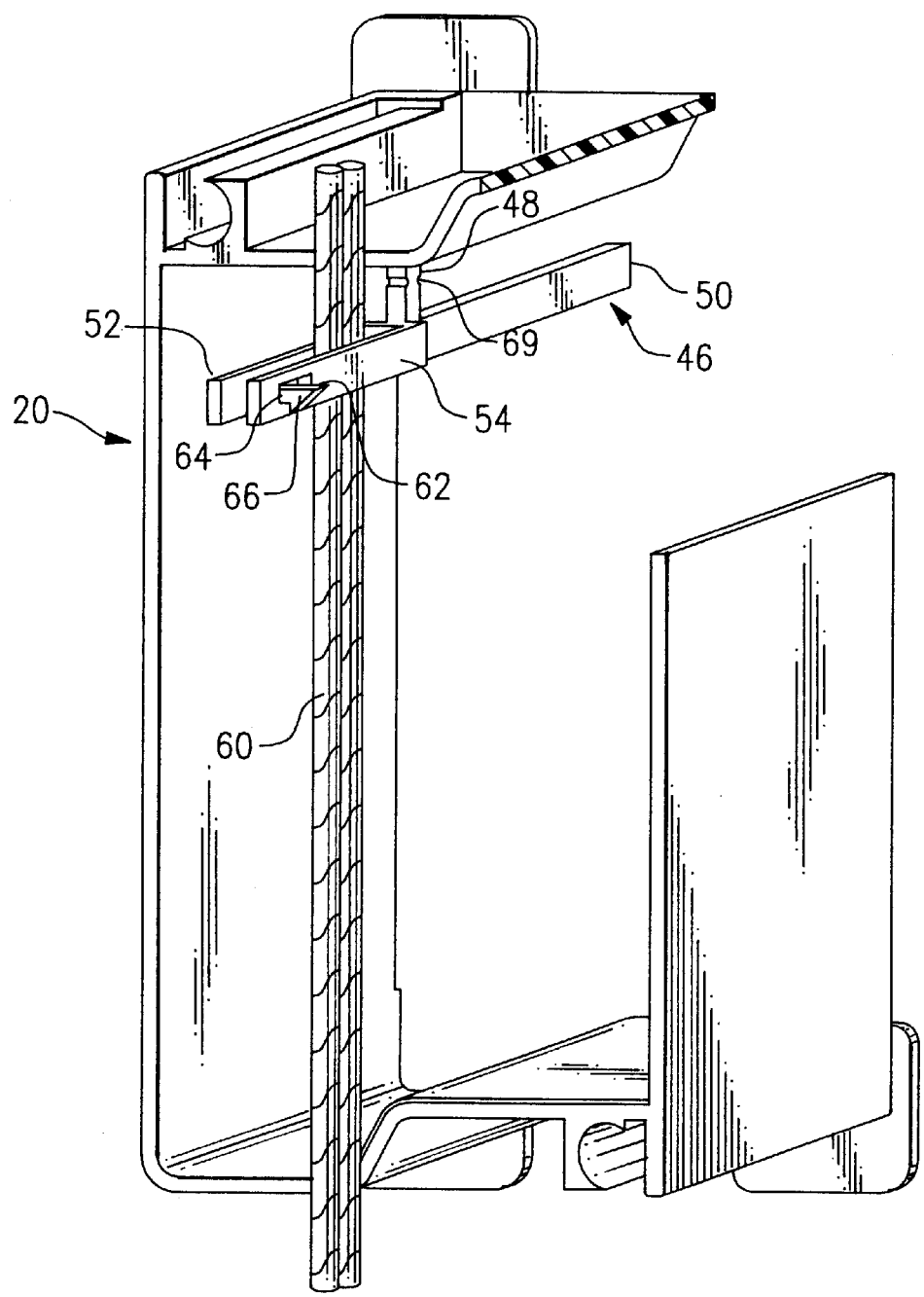
FIG. 3 is a cut away view of the junction box of FIG. 2, with the cable retainer shown in its closed position.

As shown in FIG. 3, when the two arms 52, 54 are brought into close proximity, the barbed end 66 of the hook 62 can be inserted through the opening 64 and the low voltage cable 60 is trapped between the gripping members 68. An area of weakness, such as a notch 69, in the link 48 facilitates removal of the clamping assembly 46, as described hereafter. When the time comes to connect the cable 60 to a connector in a wall plate, the electrician grabs handle 50, rocks it back and forth, and breaks off the entire clamping assembly 46 from the top wall 24, pulls the clamping assembly 46 and the attached cable 60 through the box 20, frees the cable 60 from the gripping members 68 and discards the clamping assembly 46. The cable 60 can either be cut, or the attaching arms 52, 54 can be opened to free the end of the cable 60, any damaged portion of cable 60 removed, and the low voltage wires of the cable 60 attached to the connector, substantially as already described.

Figure 4:
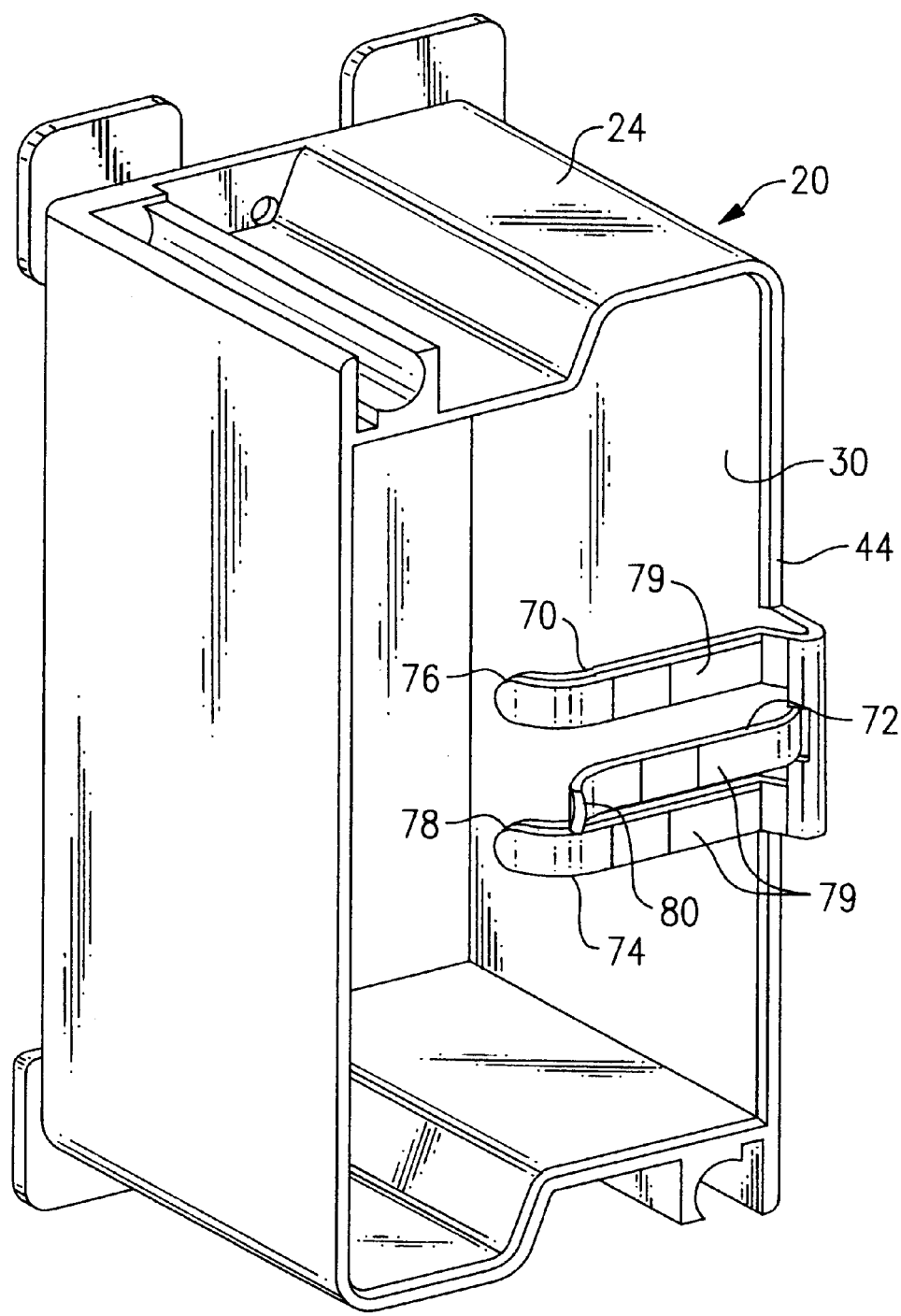
FIG. 4 is a perspective view of a junction box in accordance with yet another aspect of the invention.
Figure 5:
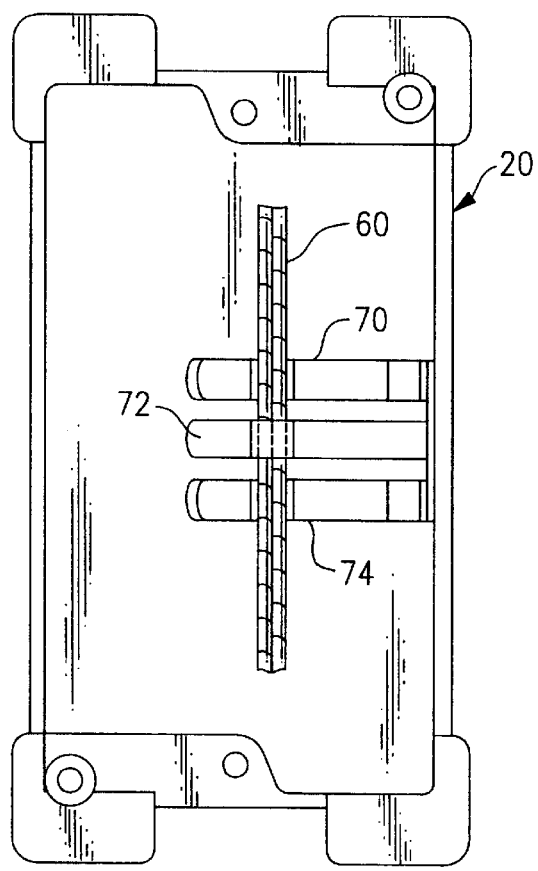
FIG. 5 is a rear elevation of the junction box of FIG. 4.

Still another embodiment of the invention is shown in a perspective view in FIG. 4. A junction box 20, substantially identical to the junction boxes 20 described in connection with the embodiments illustrated in FIGS. 1–3 is provided. Three gripping fingers 70, 72, 74 are attached to approximately the center of the rear edge 44 of the right side wall 30 of the box 20. The upper and lower gripping fingers 70, 74, respectively, have slightly bent ends 76, 78, respectively, that turn towards the interior of the box, while the center gripping finger 72 has a slightly bent end 80 which turns in the opposite direction. Alternatively, the direction of bending of the ends of the fingers can be reversed. The intermediate portions 79 of the three fingers are generally flat. Preferably the gripping fingers are all coextensive with each other. The junction box of FIG. 4 is shown in a rear elevation in FIG. 5, and the arrangement of the three fingers 70, 72, 74 can be even more clearly seen therein. Each finger 70, 72, 74 can be provided with integral gripping members for gripping a cable 60.

Figure 6:
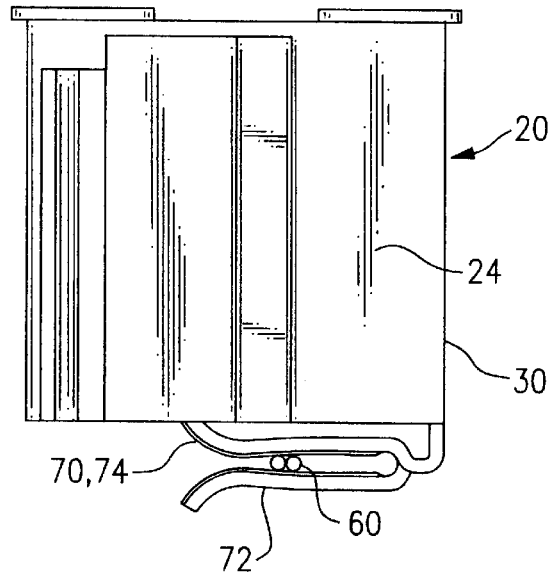
FIG. 6 is a top plan view of the junction box of FIG. 4.

As shown in FIG. 6, as viewed from the top, the three fingers 70, 72, 74 are slightly offset. The upper and lower inwardly pointing fingers 70, 74 are disposed slightly closer to the box 20 than the middle outwardly pointing finger 72. This allows a low voltage electrical cable 60 to be inserted between the fingers with the upper and lower fingers 70, 74 on one side of the cable and the middle finger 72 on the other side of the cable, thereby gripping it securely, so that it will not drop into the wall between the time of installation and the time the cable is attached to a connector on a mounting plate.

Figure 7:
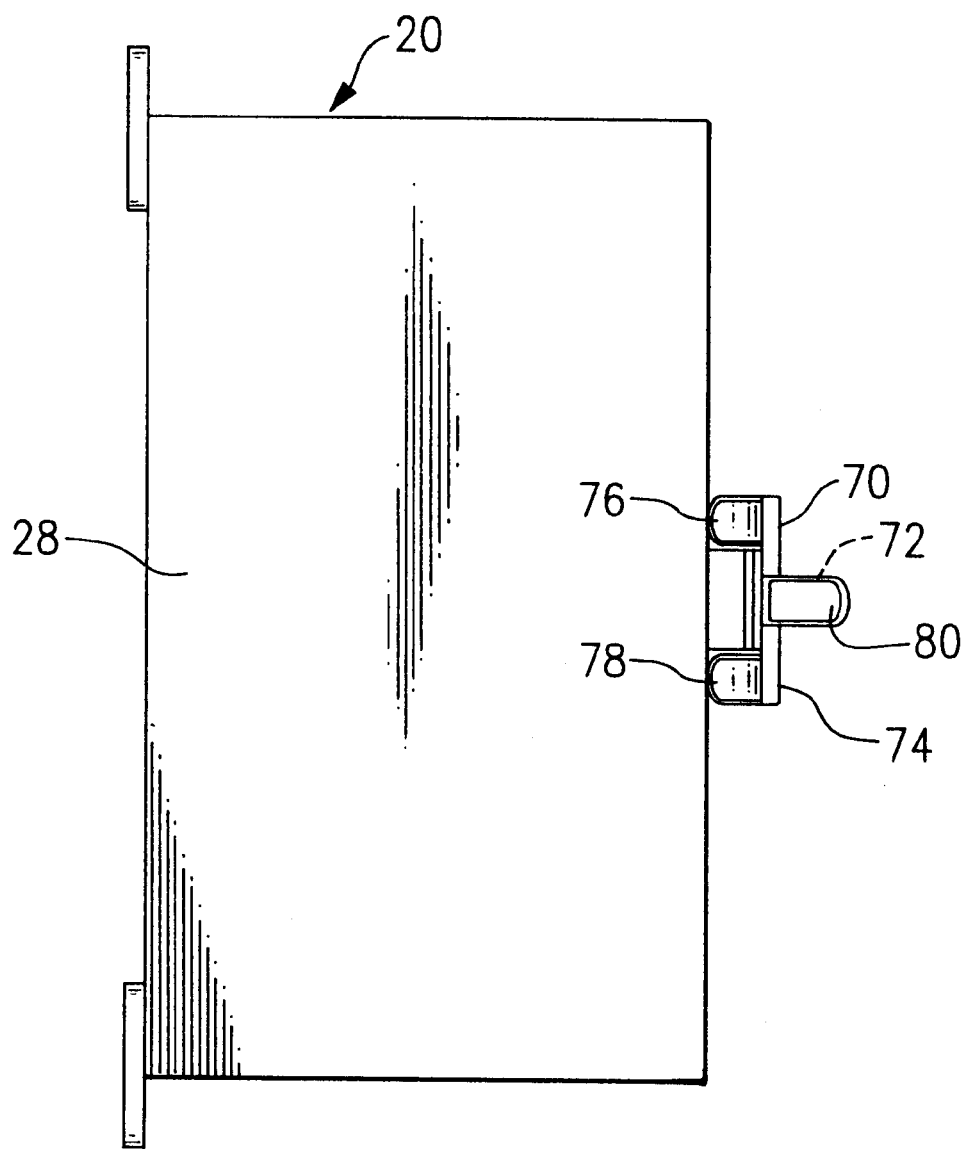
FIG. 7 is a side elevation of the junction box of FIG. 4.

Referring to FIG. 7, there is shown a left side elevation of the junction box 20 of FIG. 4. The disposition of the ends 76, 78, 80 of the respective fingers 70, 74, 72 is clearly seen.

Figure 8:
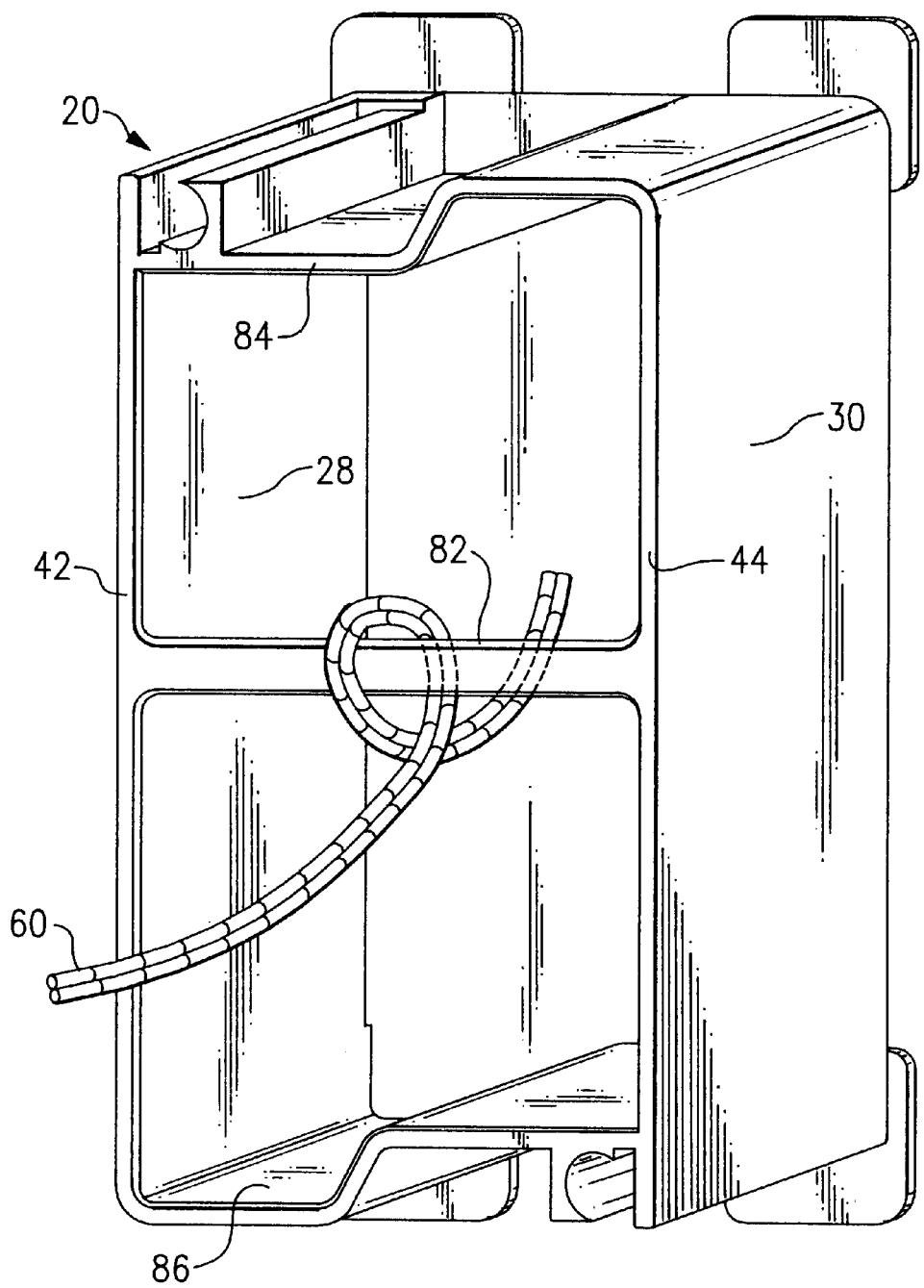
FIG. 8 is a perspective view of the junction box in accordance with still a further embodiment of the invention.

Still another embodiment of the invention is shown in FIG. 8. In this embodiment, a cable retainer in the form of a mounting bar 82 is attached at its opposite ends to approximately the center of the rear edges 42, 44 of the left and right side walls 28, 30 of the junction box 20 respectively. A low voltage cable 60 can be inserted into the box through one of the large openings formed by the bar and the top and bottom edges 84, 86, of the box 20 respectively, and formed into a loop around the bar 82 so as to retain the cable in place during installation of the wallboard or the like.

The different cable retainers or clamping members may be made of plastic or metal, depending, in part, on the material used to construct the junction box itself. Preferably, the junction box and the retainer are formed of the same moldable plastic.

The junction box of the invention is advantageous in that it includes a cable retainer that prevents small diameter, low voltage wiring from accidentally slipping back into a wall during wall construction. Furthermore such a junction box is versatile, inexpensive and easy to use.

While the invention has been described in connection with several presently preferred embodiments thereof, those skilled in the art will recognize that many or at least a few modifications and changes may be made without departing from the true spirit and scope of the invention, which accordingly is intended to be defined solely by the appended claims.

What is claimed is:

1. A junction box for low voltage electrical circuits, comprising:
   a continuous wall surrounding the interior of the box and defining first and second substantially open ends;
   a fitting on the first open end of the box for attaching a wall plate to the box; and
   a cable retainer attached to the wall of the box within the second open end for retaining a low voltage electrical wire;
   in which the cable retainer comprises first and second opposed members extending laterally from respective rear edges of opposite sides of the wall of the box, a length of the first member being coextensive with and parallel to a length of the second member, both members being in essentially the same plane.

2. A generally rectangular shaped junction box for low voltage electrical circuits, comprising:
   left and right side walls, a top wall, and a bottom wall forming a continuous wall surrounding an interior of the box and defining front and rear substantially open ends;
   a fitting on one of the open ends of the box for attaching a wall plate to the box; and
   a cable retainer attached to the box for retaining a low voltage electrical wire; in which the cable retainer comprises first and second members extending laterally from respective rear edges of the left and right side walls, a length of the first member being coextensive with and parallel to a length of the second member, both members being essentially the same plane.

3. A generally rectangular shaped junction box for low voltage electrical circuits, comprising:
   left and right side walls, a top wall, and a bottom wall forming a continuous wall surrounding an interior of the box and defining front and rear substantially open ends;
   a fitting on one of the open ends of the box for attaching a wall plate to the box;
   a means for attaching the box to a surface; and
   a cable retainer attached to the box for retaining a low voltage electrical wire; in which the retainer comprises a bar connected between the left and right sides walls of the box and the bar is intermediate between the top and bottom walls of the box.

4. A junction box for low voltage electrical circuits, comprising:
   a continuous wall surrounding the interior of the box and defining first and second substantially open ends;
   a fitting on the first open end of the box for attaching a wall plate to the box; and
   a cable retainer attached to the wall of the box within the second open end for retaining a low voltage electrical wire;
   in which the cable retainer comprises first, second, and third, spaced apart, gripping fingers extending laterally and in parallel from a rear edge of the wall, the second finger lying between the first and third fingers and being offset from a plane of the first and third fingers.

5. The junction box of claim 4, in which a terminal end of each of the first and third fingers is bent in one direction from the plane and a terminal end of the second finger is bent in an opposite direction.

6. A generally rectangular shaped junction box for low voltage electrical circuits, comprising:
   left and right side walls, a top wall, and a bottom wall forming a continuous wall surrounding an interior of the box and defining front and rear substantially open ends;
   a fitting on one of the open ends of the box for attaching a wall plate to the box; and
   a cable retainer attached to the box for retaining a low voltage electrical wire; in which the cable retainer comprises first, second, and third, spaced apart, gripping fingers extending laterally and in parallel from a rear edge of one of the left and right side walls, the second finger lying between the first and third fingers and being offset from a plane of the first and third fingers.

7. The junction box of claim 6, in which a terminal end of each of the first and third fingers is bent in one direction from the plane and a terminal end of the second finger is bent in an opposite direction.

8. A junction box for low voltage electrical circuits, comprising:
   a continuous wall surrounding the interior of the box and defining first and second substantially open ends;
   a fitting on the first open end of the box for attaching a wall plate to the box; and
   a cable retainer attached to the wall of the box within the second open end for retaining a low voltage electrical wire;
   in which the cable retainer is a clamping assembly, the clamping assembly comprising:
      a removable link attached at a first end to the wall of the box;
      a handle extending from a second end of the link into the interior of the box;
      a hinge attached to the second end of the link; and
      first and second opposed arms attached to opposite ends of the hinge.

9. The junction box of claim 8, in which the removable link further comprises an area of weakness.

10. The junction box of claim 8, in which the hinge comprises first and second living hinges attached to opposed sides of the second end of the link.

11. The junction box of claim 8, in which the first arm comprises a hook and the second arm comprises an opening for receiving the hook.

12. The junction box of claim 8, in which each of the first and second arms comprises a plurality of gripping members.

13. A generally rectangular shaped junction box for low voltage electrical circuits, comprising:
   left and right side walls, a top wall, and a bottom wall forming a continuous wall surrounding an interior of the box and defining front and rear substantially open ends;

a fitting on one of the open ends of the box for attaching a wall plate to the box; and a cable retainer attached to the box for retaining a low voltage electrical wire; in which the cable retainer is a clamping assembly, the clamping assembly comprising:
  a removable link attached at a first end to the top wall;
  a handle extending from a second end of the link into the interior of the box;
  a hinge attached to the second end of the link; and
  first and second opposed arms attached to opposite ends of the hinge.

14. The junction box of claim 13, in which the first arm comprises a hook and the second arm comprises an opening for receiving the hook.

15. The junction box of claim 13, in which each of the first and second arms comprises a plurality of gripping members.

16. The junction box of claim 13, in which the hinge comprises first and second living hinges attached to opposed sides of the second end of the link.

\* \* \* \* \*